Aug. 23, 1932.   J. GALAMB   1,873,572
REFRIGERATOR VEHICLE
Filed Feb. 17, 1931   2 Sheets-Sheet 2
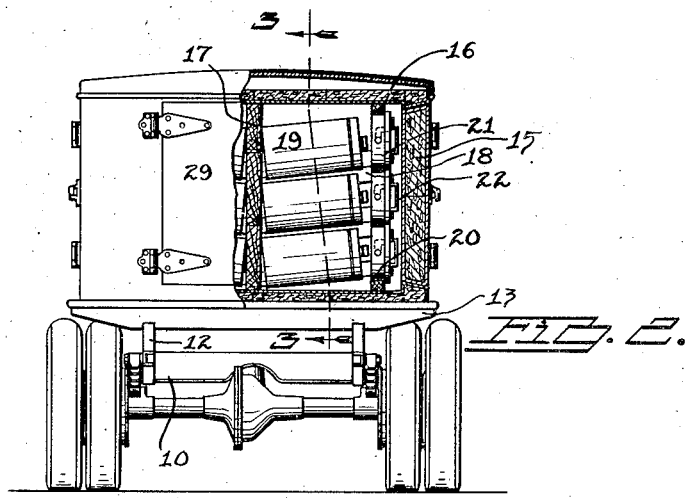
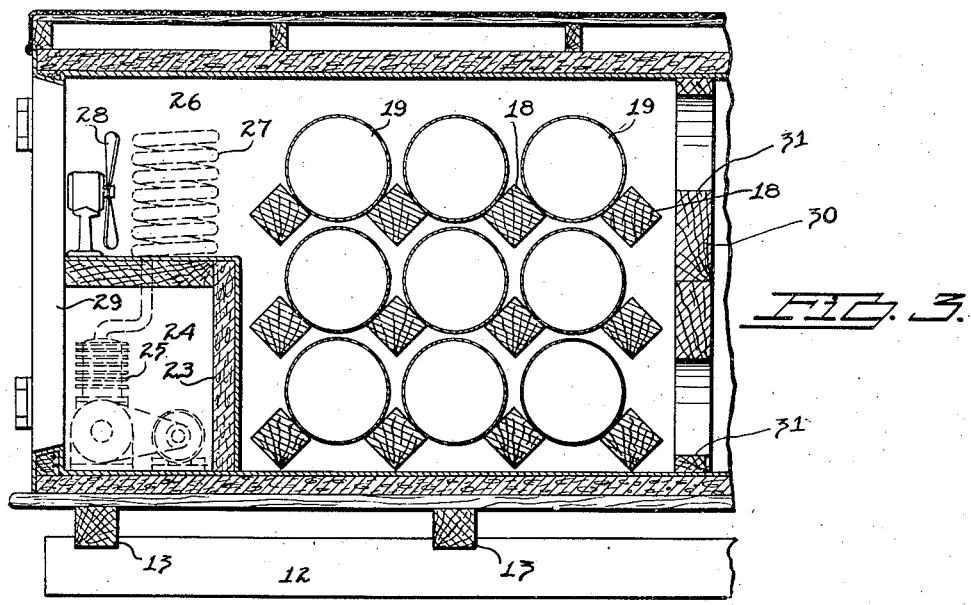
INVENTOR.
Joseph Galamb
BY
ATTORNEY.
Witness.

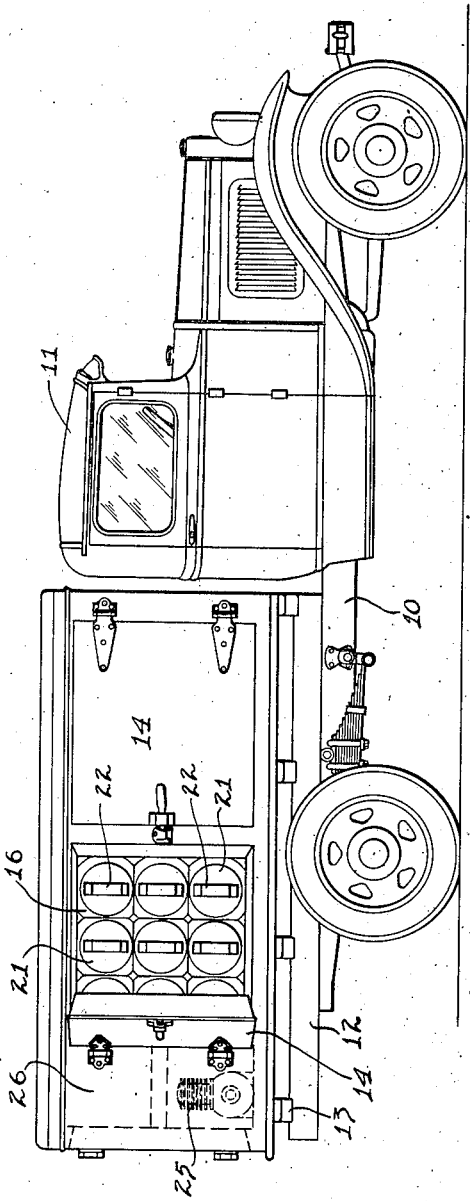

Patented Aug. 23, 1932

1,873,572

UNITED STATES PATENT OFFICE

JOSEPH GALAMB, OF DETROIT, MICHIGAN, ASSIGNOR TO FORD MOTOR COMPANY, OF DEARBORN, MICHIGAN, A CORPORATION OF DELAWARE

REFRIGERATOR VEHICLE

Application filed February 17, 1931. Serial No. 516,392.

The object of my invention is to provide a vehicle to be used primarily as a refrigerating car for the transportation of frozen goods, such as ice cream or the like. An important feature in this connection is that I provide a vehicle wherein a special compartment is provided to accommodate each individual ice cream can, each of which compartment is provided with an individual cover so that only a single relatively small door or cover need be opened to extract any container from the vehicle. In general, the body, a cold storage portion of my vehicle, consists of a rectangular shaped cork insulated box having racks therein upon which the ice cream cans are placed. A plurality of openings in the sides of the body are aligned with these racks so that containers may be inserted or withdrawn from the racks through their respective openings. Suitable plugs or covers are adapted to close these openings to thereby secure a fairly tight refrigerating compartment in the body.

It is well known that the efficiency of a refrigerator depends upon its heat absorption or what is ordinarily termed, its cold loss factor. These losses arise from three sources, that is, the heat conduction through the insulated walls of the refrigerator; the length of the contacting joint of the refrigerator doors; and the loss of refrigerated air when the refrigerator doors are open. The loss due to conduction and that due to the contacting joints of the refrigerator doors are both constant and can best be minimized by using a good grade of insulating material in the box and by making the refrigerator doors as small as possible for the use intended.

The loss of refrigerated air when the doors are open depends on the service in which the vehicle is used, that is, in vehicles which require very little opening and closing of the doors this loss is small, while in those services which require frequent handling of the goods, as in the delivery of ice cream to neighborhood stores, this loss is the major loss encountered.

In order to minimize all of these losses, I provide an individual door for each ice cream can so that the loss of refrigerated air through the very small door opening is very little. Still further, the location of each particular kind of ice cream is apparent to the driver as these doors may be marked so that the withdrawing of the can is done very rapidly thereby allowing the door to remain open only a very short time. With this vehicle no handling or sorting out is required to immediately withdraw a particular kind of ice cream. In the ordinary refrigerator vehicle the door is left open while the driver enters and sorts over the various containers and finally extracts the particular can desired. The heat absorption is very great with such structures both because the vehicle door must be large enough to allow the driver to enter and further because the door is invariably left open a much longer time than is necessary with the relatively small plugs which form the closures for the applicant's device.

Due to the large number of individual doors which are provided to close the container compartments in my vehicle, the total length of the lines of contact or joints of these doors is much longer than the joint of the ordinary single door refrigerator. The heat absorption from this cause would therefore be greater than in the single door structure, so that my structure could be advantageously used only where frequent stops were to be made. However, I have provided means whereby even the cold loss from this cause is reduced to less than that of the ordinary refrigerator. A pair of large doors are provided on each side of the vehicle which give access to the individual compartment doors. Thus, when one of these large doors is opened the rush of warm air tending to enter the vehicle is stopped by the individual compartment doors, while the constant cold loss due to the relatively long joint of these small doors is reduced to a negligible amount by the large outer doors.

By so reducing the cold losses, I am enabled to provide a refrigerator which will require an exceptionally small amount of cooling to maintain a constant freezing temperature therein. The use of solidified carbon dioxide, or what is better known as dry ice, can be therefore economically used for cooling this vehicle which use is prohibited in the ordinary refrigerator car due to the relatively high cost of this refrigerant.

There are many advantages obtained by the use of dry ice and it is to the operator's advantage to be able to use this refrigerant economically. This refrigerant being odorless cannot contaminate odor absorbing food stuffs as sometimes happens with ordinary ice. Further, it being dry, no moisture is liberated so that hygroscopic substances may be transported. Still further, dry ice occupies very little space as compared to ordinary ice. Perhaps the greatest advantage obtained by the use of this refrigerant is that freezing temperatures can readily be maintained. Not only can ice cream be kept cold with this substance but it can be kept frozen which is impossible to do with ordinary ice alone. Where the container must be kept at a subfreezing temperature, it has been necessary to pack the container in ice and salt which is not only troublesome but also adds to the weight of the container and the space occupied in the vehicle.

Still a further object of my invention is to provide a vehicle having individual container receiving compartments therein which are connected with each other so as to allow free circulation of refrigerated vapor around these compartments to keep the contents thereof at a predetermined temperature.

With these and other objects in view, my invention consists in the arrangement, construction and combination of the various parts of my improved device, as described in this specification, claimed in my claims and illustrated in the accompanying drawings in which:

Figure 1 shows a side elevation of my improved vehicle.

Figure 2 shows a rear view of the vehicle shown in Figure 1, parts being broken away to better illustrate the construction, and Figure 3 shows an enlarged cross sectional view, taken on the line 3—3 of Figure 2.

Referring to the accompanying drawings, I have used the reference numeral 10 to indicate a truck chassis having a driver's cab 11 placed thereon in the conventional manner. A pair of longitudinal sill members 12 are fastened to the top and to the rear of the chassis and a plurality of cross beams 13 extend across the upper edges of these sills upon which my improved refrigerator body is mounted.

This refrigerator compartment consists generally of a rectangular shaped box which is insulated on all sides and top and bottom with a layer of cork blocks 15. Each side of the refrigerator is provided with a pair of square doors 14 hinged flush to the vehicle sides to swing outwardly, these doors being also insulated with cork similar to the cork blocks 15 used in the rest of the refrigerator. It will be understood that the particular material used for insulating my refrigerator forms no part of my invention and that material other than cork may be used if desired.

Just inside of the doors 14 and extending the length of the vehicle I have provided partitions 16. These partitions form an auxiliary wall on each side of the refrigerator, the inside of doors 14 closing almost flush with these partitions. The partitions are built up from cork and wood and each extend from the floor to the roof of the vehicle so that the space between the two partitions 16 forms a doubly insulated refrigerating space. A vertical supporting wall 17 extends lengthwise through the center of the refrigerator which wall is suitably perforated to allow free circulation of air therethrough. I have provided a plurality of guide bars 18 which extend between each partition 16 and the central wall 17 to form transverse racks wherewith free circulation of air is assured. The inner ends of the bars 18 are somewhat lower than their height at the partitions 16 so that ice cream cans 19 placed thereon will not tend to slide toward the partitions under ordinary conditions. From Figure 3 it will be seen that the bars 18 are so placed that each container 19 just rests between a pair of the bars, leaving a sufficient space between the upper side of the can and the lower side of the can above to allow circulation of air between the cans.

In order to insert the cans on these racks, each of the partitions 16 is provided with circular openings 20 symmetrically placed between the bars 18 so that the cans can be inserted therethrough to rest upon a pair of the guide bars 18. Each of these openings 20 is provided with a plug 21 constructed from suitable insulation material in a manner similar to the construction of refrigerator doors and a handle 22 is secured to the outer face of each of these plugs so that the individual plug may be readily removed from its opening 20. A bayonet type locking means is provided for securing each plug in place, however, other types of locking devices may be provided if desired, i. e., the inherent friction of the plug and opening or the abutting doors 14 may bear against the handles 22 to secure the plugs therein. If this latter construction is used, the handles 22 should be resilient to insure all of the plugs fitting accurately.

Spaced from the rear wall of the vehicle, I have provided an insulating partition 23 whereby a compartment 24 in the rear of the vehicle is formed to house a refrigerating machine, shown by dotted lines 25. It will be noted that the compartment 24 extends the full width of the vehicle but only about half of its height, the space directly above the compartment forming a chamber 26 which is in direct connection with the main refrigerating compartment. It is preferable to locate expansion or cooling coils, as shown by dotted lines 27, for use with the machine 25, in this chamber and to provide a fan 28 therein to circulate the air in the refrigerator over these coils. The use of such refrigerating machine is only optional and, if desired, it may be dispensed with and the chamber 26 used solely for the accommodation of dry ice, the fan 28 being retained to circulate the air around this refrigerant. A rear door 29 is provided in the vehicle to give access to the compartments 24 and 26 when it is desired to service the refrigerating machine 25, or, if dry ice is used, to replenish the supply of dry ice.

In order to add rigidity to the refrigerator, I have provided a vertical transverse partition 30 extending through the center of the refrigerator compartment. This partition is suitably perforated, as at 31, so that free circulation of refrigerated air between the compartments on each side thereof will be obtained.

Among the many advantages arising from the use of my improved device it may be well to mention that, due to the very small plug required to be opened for the extraction of a can of ice cream, the heat absorption or loss of refrigerated air from this opening is very small. Still further, because the desired can is readily accessible as soon as the plug is removed, the plug remains open only a very short time, thereby still further reducing the heat absorption. In order that the cold loss normally caused by the relatively long combined length of the joints between my individual plugs and the partitions 16 be minimized, large outer doors are provided which remain closed when a can is not actually being removed.

It will thus be seen that I have provided a vehicle having a very low heat absorption or cold loss factor so that I am enabled to economically use dry ice as the refrigerant therein. This refrigerant, due to its relatively high cost, is now prohibited from use in ordinary refrigerators. Still further, in the localities where the distribution of such dry ice has not yet been possible, a very small refrigerating machine may be used to maintain a freezing temperature in the refrigerator, which machine may be housed in the vehicle and operated from the ordinary batteries in the vehicle.

Some changes may be made in the arrangement, construction and combination of the various parts of my improved device without departing from the spirit of my invention, and it is my intention to cover by my claims such changes as may reasonably be included within the scope thereof.

I claim as my invention:

1. In a refrigerating vehicle having an article receiving and heat insulated compartment therein, a relatively large insulated door in each side of said compartment, an insulated partition extending across the compartment just inside of each door, horizontal racks extending between said partitions, and a plurality of relatively small insulated doors in each of said partitions giving access to said racks, access to the small doors being had only through the large doors.

2. In a refrigerating vehicle having an article receiving and heat insulated compartment therein, a relatively large insulated door in each side of said compartment, insulated partitions extending the length of said compartment in position substantially flush with the inner faces of said doors whereby these doors are insulated from the article receiving compartment, a plurality of bars extending between said partitions to form article receiving racks, and a plurality of relatively small insulated doors in said partition giving access to said racks.

3. In a refrigerating vehicle having a rectangular-shaped article receiving and heat insulated compartment forming the body portion thereof, a pair of relatively large insulated doors in the side of said body, insulated partitions extending the length of the body in position substantially flush with the inner faces of said doors whereby these doors are insulated from the article receiving compartment, a plurality of spaced transverse bars extending between the partitions to form ventilated article receiving racks, and a plurality of relatively small insulating doors in each of said partitions giving access to said racks.

4. In a refrigerating vehicle having a rectangular-shaped article receiving and heat insulated compartment forming the body portion thereof, a relatively large insulated door in each side of said body, an insulating partition extending the length of the body adjacent to the inner face of each door, to thereby insulate the article receiving compartment from said door openings, a central vertical supporting wall extending the length of said body, inclined transverse bars extending between the opposite sides of said wall and each of said partitions to thereby form container racks, and a plurality of relatively small insulated doors in each of said partitions through which each of said containers may be withdrawn only when said large door is open.

JOSEPH GALAMB.